United States Patent
Li et al.

(10) Patent No.: US 9,094,274 B2
(45) Date of Patent: Jul. 28, 2015

(54) TERMINAL DEVICE AND METHOD FOR SENDING PERIODIC SIGNAL

(71) Applicant: Huawei Technologies Co., Ltd., Shenzhen (CN)

(72) Inventors: Yang Li, Shenzhen (CN); Taolin Zhang, Shenzhen (CN); Qiang Ding, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 14/308,338

(22) Filed: Jun. 18, 2014

(65) Prior Publication Data
US 2014/0376649 A1 Dec. 25, 2014

(30) Foreign Application Priority Data
Jun. 19, 2013 (CN) .......................... 2013 1 0243115

(51) Int. Cl.
*H04L 27/26* (2006.01)
*H04B 3/46* (2015.01)

(52) U.S. Cl.
CPC .............. *H04L 27/2666* (2013.01); *H04B 3/46* (2013.01); *H04L 27/2613* (2013.01); *H04L 27/2626* (2013.01)

(58) Field of Classification Search
CPC .............. H04L 27/2601; H04L 27/261; H04L 27/2613; H04L 27/2666; H04L 27/2626; H04B 17/0017; H04B 17/0012; H04B 17/0085; H04B 1/76; H04B 3/46
USPC ......... 375/219, 220, 224, 231, 259, 260, 295, 375/364
See application file for complete search history.

(56) References Cited

U.S. PATENT DOCUMENTS

| | | | |
|---|---|---|---|
| 6,539,411 B1 * | 3/2003 | Johnson | 708/271 |
| 7,327,816 B2 * | 2/2008 | Messier | 375/354 |
| 7,424,064 B2 | 9/2008 | Shakeshaft et al. | |
| 8,064,501 B2 * | 11/2011 | Clausen | 375/219 |
| 2004/0240567 A1 | 12/2004 | Akita et al. | |

FOREIGN PATENT DOCUMENTS

| | | |
|---|---|---|
| CN | 1574781 A | 2/2005 |
| CN | 101162919 A | 4/2008 |

* cited by examiner

Primary Examiner — Leon Flores
(74) Attorney, Agent, or Firm — Slater & Matsil, L.L.P.

(57) ABSTRACT

A terminal device includes a central processing unit, a data memory, a first selector, and a digital-to-analog conversion module. The data memory includes a first data storage apparatus and a second data storage apparatus. A first output end of the central processing unit is connected to an input end of the first selector. A second output end of the central processing unit is connected to a gating end of the first selector. An output end of the second data storage apparatus is connected to an input end of the digital-to-analog conversion module. The digital-to-analog conversion module is configured to send repeatedly a periodic signal to a receiving device within a sending time.

11 Claims, 8 Drawing Sheets

TERMINAL DEVICE AND METHOD FOR SENDING PERIODIC SIGNAL

CROSS-REFERENCE TO RELATED APPLICATIONS

This application claims priority to Chinese Patent Application No. 201310243115.9, filed on Jun. 19, 2013, which is hereby incorporated by reference in its entirety.

TECHNICAL FIELD

The present invention relates to the communications field, and in particular, to a terminal device and a method for sending a periodic signal.

BACKGROUND

A spectrum that can be used in an orthogonal frequency division multiplexing (OFDM) system is divided into a plurality of subcarriers, and each subcarrier can bear different data amounts according to a condition of a transmission channel. Therefore, after the OFDM system is started, a set of handshake and initialization mechanisms need to be established between a central office end and a terminal to perform protocol negotiation, channel discovering training and reference exchange. A data service interworking stage can be entered only after these stages are finished.

When the channel training is performed between the central office end and the terminal, usually, a terminal device (the central office end or the terminal) sends a series of initialization signals with a specified power spectrum to a receiving device (the terminal or the central office end), and the receiving device evaluates a bearing capability of each subcarrier according to the spectrum of the received signal, so as to obtain an evaluation about a data communication capability in this direction. In addition, in an initialization process of the channel training, the terminal device needs to uninterruptedly send specified initialization signals to the receiving device, and if an interruption occurs in the middle of the sending, the receiving device cannot detect a signal and therefore offline occurs, that is, in the initialization process, the terminal device needs to process initialization signals uninterruptedly, and software resources and hardware resources of the terminal device cannot be used for other computations.

SUMMARY

Embodiments of the present invention provide a terminal device and a method for sending a periodic signal, so that the terminal device can further use software resources and hardware resources to perform other computations while needing to process uninterruptedly an initialization signal in an initialization process.

According to a first aspect, an embodiment of the present invention provides a terminal device, including: a central processing unit (CPU), a data memory, a first selector, and a digital-to-analog conversion module, where the data memory includes a first data storage apparatus and a second data storage apparatus.

A first output end of the central processing unit is connected to an input end of the first selector; a second output end of the central processing unit is connected to a gating end of the first selector; and the central processing unit performs, according to a sending time that is of a periodic signal and specified by a protocol, a performance improvement computation on a target signal within the sending time, to obtain a computation signal, transmits the computation signal to the input end of the first selector, and controls to send a selection signal to the gating end of the first selector within the sending time, where the selection signal is used to make the first selector select a data storage apparatus from the first data storage apparatus and the second data storage apparatus as a candidate data storage apparatus; and controls to send a sending signal to the digital-to-analog conversion module within the sending time, where the sending signal is used to make the digital-to-analog conversion module send a signal stored by a target data storage apparatus to a receiving device, generate the periodic signal before the sending time, and transmit the periodic signal to the input end of the first selector, where the periodic signal is a periodic signal used for channel training.

A first output end of the first selector is connected to an input end of the first data storage apparatus; a second output end of the first selector is connected to an input end of the second data storage apparatus; and the first selector is configured to receive the selection signal, select a data storage apparatus from the first data storage apparatus and the second data storage apparatus as the candidate data storage apparatus according to the selection signal, select the other data storage apparatus from the first data storage apparatus and the second data storage apparatus as the target data storage apparatus, transmit the computation signal to the candidate data storage apparatus, and transmit the periodic signal to the target data storage apparatus.

An output end of the first data storage apparatus is connected to an input end of the digital-to-analog conversion module; and the first data storage apparatus is configured to store the computation signal when the first data storage apparatus is the candidate data storage apparatus, and store the periodic signal when the first data storage apparatus is the target data storage apparatus.

An output end of the second data storage apparatus is connected to the input end of the digital-to-analog conversion module; and the second data storage apparatus is configured to store the computation signal when the second data storage apparatus is the candidate data storage apparatus, and store the periodic signal when the second data storage apparatus is the target data storage apparatus.

The digital-to-analog conversion module is configured to repeatedly send, according to the sending signal and within the sending time, the periodic signal stored by the target data storage apparatus to the receiving device.

In a first possible implementation manner of the first aspect, the terminal device further includes:

a hardware accelerator, where an input end of the hardware accelerator is connected to the first output end of the central processing unit; an output end of the hardware accelerator is connected to the input end of the first selector; and the hardware accelerator is configured to perform hardware acceleration processing on the computation signal transmitted by the central processing unit and then transmit the computation signal obtained by acceleration processing to the first selector.

With reference to the first possible implementation manners of the first aspect, in a second possible implementation manner of the first aspect, the selection signal is a first level signal, and the first selector is configured to: when the gating end of the first selector receives the first level signal, control the input end of the first selector to connect to the first output end of the first selector, select the first data storage apparatus as the candidate data storage apparatus, and select the second data storage apparatus as the target data storage apparatus.

The first selector is further configured to: when the gating end of the first selector receives a second level signal, control the input end of the first selector to connect to the second output end of the first selector, select the second data storage apparatus as the candidate data storage apparatus, and select the first data storage apparatus as the target data storage apparatus.

With reference to the second possible implementation manner of the first aspect, in a third possible implementation manner of the first aspect, the sending signal is the first level signal, and the terminal device further includes:

a second selector, where an output end of the second selector is connected to the input end of the digital-to-analog conversion module; a first input end of the second selector is connected to the output end of the second data storage apparatus; a second input end of the second selector is connected to the output end of the first data storage apparatus; a gating end of the second selector is connected to the gating end of the first selector; and the second selector is configured to: when the gating end of the second selector receives the first level signal, control the output end of the second selector to connect to the first input end of the second selector; and when the gating end of the second selector receives the second level signal, control the output end of the second selector to connect to the second input end of the second selector.

With reference to the third possible implementation manner of the first aspect, in a fourth possible implementation manner of the first aspect, the terminal device further includes:

a third selector, where a gating end of the third selector is connected to the second output end of the central processing unit; a first input end of the third selector is connected to a configuration signal; a second input end of the third selector is connected to a pulse signal; an output end of the third selector is connected to the gating end of the first selector; and the third selector is configured to: when receiving, by using the gating end, the first level signal sent by the central processing unit, control the output end of the third selector to connect to the first input end of the third selector; and when receiving, by using the gating end, the second level signal sent by the central processing unit, control the output end of the third selector to connect to the second input end of the third selector, where the configuration signal is the first level signal configured in advance or a signal configured by the central processing unit for the third selector, and the pulse signal is a periodic pulse signal alternately formed by the first level signal and the second level signal.

With reference to the fourth possible implementation manner of the first aspect, in a fifth possible implementation manner of the first aspect, the terminal device further includes:

a first control register, where an input end of the first control register is connected to the second output end of the central processing unit; an output end of the first control register is connected to the gating end of the third selector; and the first control register is configured to send the first level signal to the gating end of the third selector within the sending time and send the second level signal to the gating end of the third selector beyond the sending time.

The central processing unit is further configured to send a control signal to the first control register; and the control signal is used to make the first control register send the first level signal to the gating end of the third selector within the sending time, and make the first control register send the second level signal to the gating end of the third selector beyond the sending time.

With reference to the fourth possible implementation manner or the fifth possible implementation manner of the first aspect, in a sixth possible implementation manner of the first aspect, the terminal device further includes:

a second control register, where an output end of the second control register is connected to the first input end of the third selector; an input end of the second control register is connected to a third output end of the central processing unit; and the second control register is configured to receive the configuration signal sent by the central processing unit and send the configuration signal to the first input end of the third selector.

With reference to the first aspect, or the first possible implementation manner, in a seventh possible implementation manner of the first aspect, an input end of the central processing unit is connected to the output end of the first data storage apparatus, the input end of the central processing unit is further connected to the output end of the second data storage apparatus, and the central processing unit is further configured to read a signal stored by the first data storage apparatus or the second data storage apparatus.

With reference to the first possible implementation manner, in an eighth possible implementation manner of the first aspect, the hardware accelerator includes: at least one hardware accelerator connected in series.

According to a second aspect, an embodiment of the present invention provides a method for sending a periodic signal, including:

generating the periodic signal before a sending time that is of the periodic signal and specified by a protocol and storing the periodic signal into a target data storage apparatus, where the periodic signal is a periodic signal used for channel training;

performing a performance improvement computation on a target signal within the sending time to obtain a computation signal and storing the computation signal into a candidate data storage apparatus; and sending repeatedly the periodic signal stored by the target data storage apparatus to the receiving device within the sending time.

In the foregoing technical solutions, the CPU performs a performance improvement computation on the target signal within the sending time that is of the periodic signal and specified by the protocol, so as to obtain the computation signal. In addition, the digital-to-analog conversion module sends repeatedly the periodic signal stored by the target data storage apparatus to the receiving device within the sending time, where the periodic signal is a periodic signal used for the channel training. In this way, in an initialization process, the terminal device can further use software resources and hardware resources to perform other computations while needing to process uninterruptedly an initialization signal.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
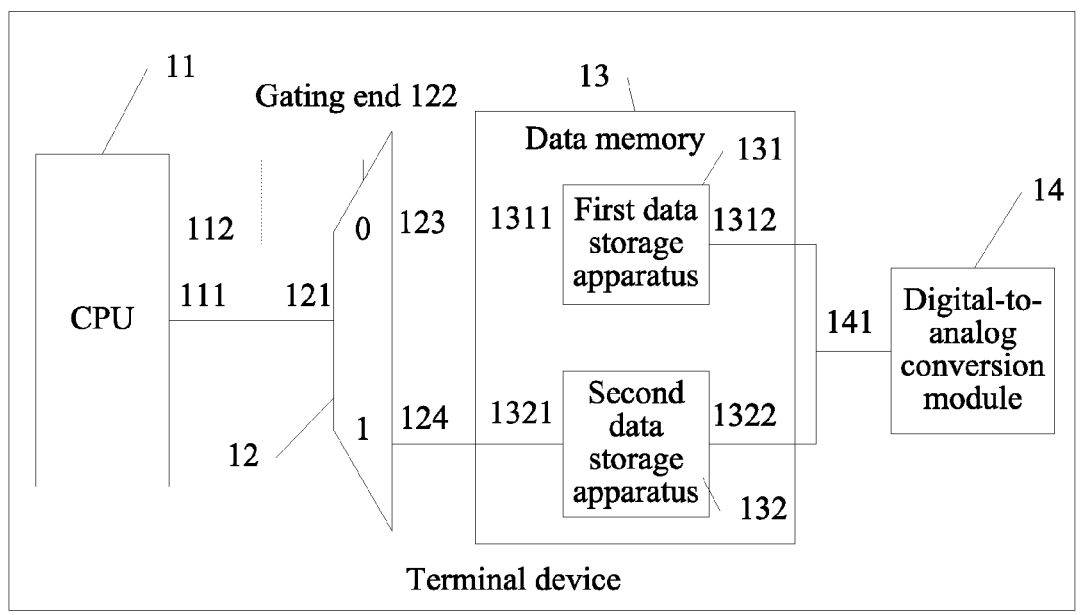
FIG. 1 is a schematic structural diagram of a terminal device according to an embodiment of the present invention.

FIG. 1 is a schematic structural diagram of a terminal device according to an embodiment of the present invention, and as shown in FIG. 1, the terminal device includes: a CPU 11, a first selector 12, a data memory 13, and a digital-to-analog conversion module 14. The data memory 13 includes a first data storage apparatus 131 and a second data storage apparatus 132.

A first output end 111 of the CPU 11 is connected to an input end 121 of the first selector 12; a second output end 112 of the CPU 11 is connected to a gating end 122 of the first selector 12; and the CPU 11 performs, according to a sending time that is of a periodic signal and specified by a protocol, a performance improvement computation on a target signal within the sending time, to obtain a computation signal, transmits the computation signal to the input end 121 of the first selector 12, and controls to send a selection signal to the gating end 122 of the first selector 12 within the sending time, where the selection signal is used to make the first selector 12 select a data storage apparatus from the first data storage apparatus 131 and the second data storage apparatus 132 as a candidate data storage apparatus; and controls to send a sending signal to the digital-to-analog conversion module 14 within the sending time, where the sending signal is used to make the digital-to-analog conversion module 14 send a signal stored by a target data storage apparatus to a receiving device, generate the periodic signal before the sending time, and transmit the periodic signal to the input end 121 of the first selector 12, where the periodic signal is a periodic signal used for channel training.

A first output end 123 of the first selector 12 is connected to an input end 1311 of the first data storage apparatus 131; a second output end 124 of the first selector 12 is connected to an input end 1321 of the second data storage apparatus 132; and the first selector 12 is configured to receive the selection signal, select a data storage apparatus from the first data storage apparatus 131 and the second data storage apparatus 132 as the candidate data storage apparatus according to the selection signal, select the other data storage apparatus from the first data storage apparatus 131 and the second data storage apparatus 132 as the target data storage apparatus, transmit the computation signal to the candidate data storage apparatus, and transmit the periodic signal to the target data storage apparatus.

An output end 1312 of the first data storage apparatus 131 is connected to an input end 141 of the digital-to-analog conversion module 14; and the first data storage apparatus 131 is configured to store the computation signal when the first data storage apparatus 131 is the candidate data storage apparatus, and store the periodic signal when the first data storage apparatus 131 is the target data storage apparatus.

An output end 1322 of the second data storage apparatus 132 is connected to the input end 141 of the digital-to-analog conversion module 14; and the second data storage apparatus 132 is configured to store the computation signal when the second data storage apparatus 132 is the candidate data storage apparatus, and store the periodic signal when the second data storage apparatus 132 is the target data storage apparatus.

The digital-to-analog conversion module 14 is configured to repeatedly send, according to the sending signal and within the sending time, the periodic signal stored by the target data storage apparatus to the receiving device.

That is, in the foregoing, the CPU performs a performance improvement computation on the target signal within the sending time that is of the periodic signal and specified by the protocol, so as to obtain the computation signal. In addition, the digital-to-analog conversion module sends repeatedly the periodic signal stored by the target data storage apparatus to the receiving device within the sending time.

Optionally, the target signal may be a signal that can be processed by any terminal device, for example, the target signal may be a signal used for channel training performed by the CPU on the receiving device, and may further be a signal used for testing or improving the performance of the CPU 11.

Optionally, the terminal device may be any central office end, or any terminal. When the terminal device is the central office end, the receiving device may be any terminal. When the terminal device is a terminal, the receiving device may be any central office end.

Optionally, the protocol may be locally obtained by the CPU 11, and may also be obtained from a network side, that is, the protocol is sent by another device to the CPU 11. The protocol specifies the sending time of the periodic signal, for example, 5 seconds or 0.5 seconds. The sending time is not limited in this embodiment.

Optionally, the first data storage apparatus 131 and the second data storage apparatus 132 may be two data storage units included in the data memory 13. The first data storage apparatus 131 and the second data storage apparatus 132 may further be two independent data memories, that is, two data memories included in the data memory 13.

Optionally, after the receiving device receives the periodic signal, the channel training may be performed.

In the foregoing technical solution, the CPU performs a performance improvement computation on the target signal within the sending time that is of the periodic signal and specified by the protocol, so as to obtain the computation signal. In addition, the digital-to-analog conversion module sends repeatedly the periodic signal stored by the target data storage apparatus to the receiving device within the sending time, where the periodic signal is a periodic signal used for the channel training. In this way, in an initialization process, the terminal device can further use software resources and hardware resources to perform other computations while needing to process uninterruptedly an initialization signal.

Figure 2:
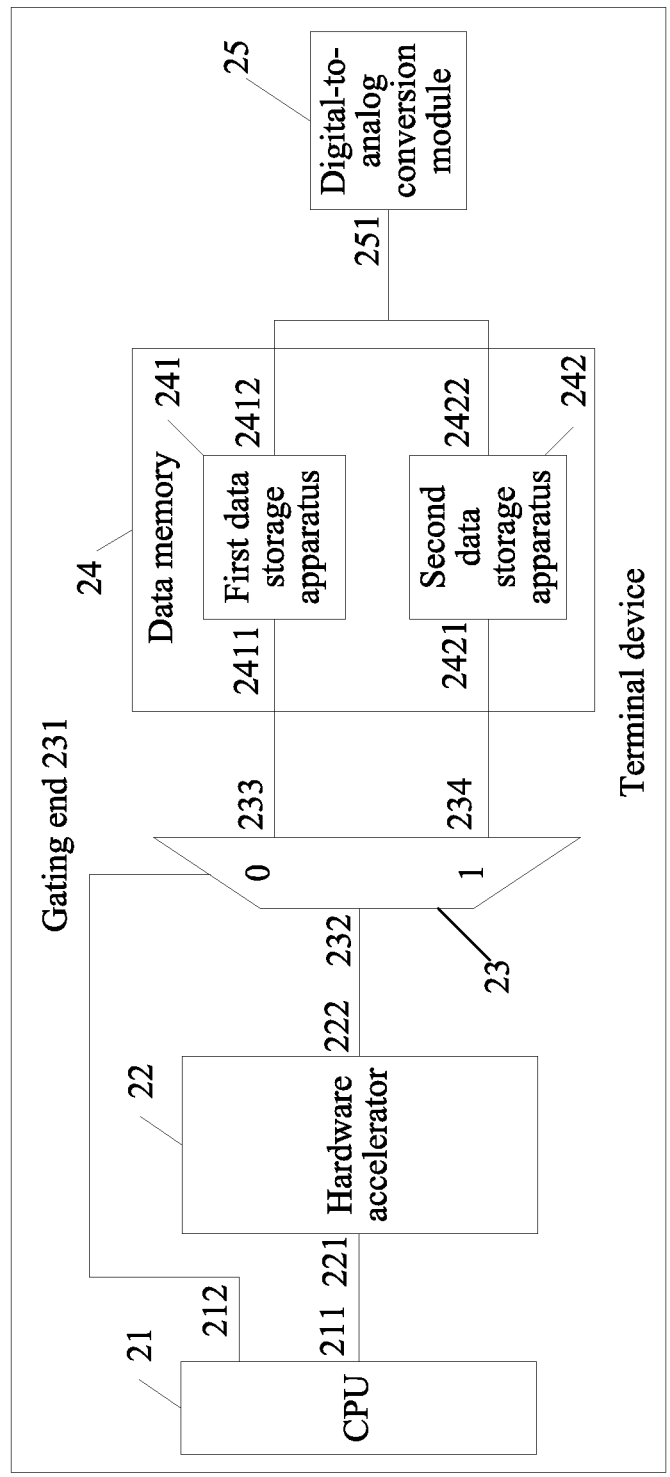
FIG. 2 is a schematic structural diagram of another terminal device according to an embodiment of the present invention.

FIG. 2 is a schematic structural diagram of a terminal device according to an embodiment of the present invention, and as shown in FIG. 2, the terminal device includes: a CPU 21, a hardware accelerator 22, a first selector 23, a data memory 24, and a digital-to-analog conversion module 25, where the data memory 24 includes a first data storage apparatus 241 and a second data storage apparatus 242.

A first output end 211 of the CPU 21 is connected to an input end 221 of the hardware accelerator 22; a second output end 212 of the CPU 21 is connected to a gating end 231 of the first selector 23; and the CPU 21 performs, according to a sending time that is of a periodic signal and specified by a protocol, a performance improvement computation on a target signal within the sending time, to obtain a computation signal, transmits the computation signal to the input end 221 of the hardware accelerator 22, and controls to send a selection signal to the gating end 231 of the first selector 23 within the sending time, where the selection signal is used to make the first selector 23 select a data storage apparatus from the first data storage apparatus 241 and the second data storage apparatus 242 as a candidate data storage apparatus; and controls to send a sending signal to the digital-to-analog conversion module 25 within the sending time, where the sending signal is used to make the digital-to-analog conversion module 25 send a signal stored by a target data storage apparatus to a receiving device, generate the periodic signal before the sending time, and transmit the periodic signal to the input end 221 of the hardware accelerator 22, where the periodic signal is a periodic signal used for channel training.

That is, the CPU 21 generates the periodic signal before the sending time, and transmits the periodic signal to the input end 221 of the hardware accelerator 22. The input end 221 of the hardware accelerator 22 transmits the periodic signal to the first selector 23. Then the first selector 23 transmits the periodic signal to the target data storage apparatus. In this way, within the sending time, the digital-to-analog conversion module 25 can send repeatedly the periodic signal stored by the target data storage apparatus to the receiving device.

The input end 221 of the hardware accelerator 22 is connected to the first output end 211 of the CPU 21; an output end 222 of the hardware accelerator 22 is connected to an input end 232 of the first selector 23; and the hardware accelerator 22 is configured to perform hardware acceleration processing on the computation signal transmitted by the CPU 21 and then transmit the computation signal obtained by acceleration processing to the first selector 23.

A first output end 233 of the first selector 23 is connected to an input end 2411 of the first data storage apparatus 241; a second output end 234 of the first selector 23 is connected to an input end 2421 of the second data storage apparatus 242; and the first selector 23 is configured to receive the selection signal, select a data storage apparatus from the first data storage apparatus 241 and the second data storage apparatus 242 as the candidate data storage apparatus according to the selection signal, select the other data storage apparatus from the first data storage apparatus 241 and the second data storage apparatus 242 as the target data storage apparatus, transmit the computation signal to the candidate data storage apparatus, and transmit the periodic signal to the target data storage apparatus.

An output end 2412 of the first data storage apparatus 241 is connected to an input end 251 of the digital-to-analog conversion module 25; and the first data storage apparatus 241 is configured to store the computation signal when the first data storage apparatus 241 is the candidate data storage apparatus, and store the periodic signal when the first data storage apparatus 241 is the target data storage apparatus.

An output end 2422 of the second data storage apparatus 242 is connected to the input end 251 of the digital-to-analog conversion module 25; and the second data storage apparatus 242 is configured to store the computation signal when the second data storage apparatus 242 is the candidate data storage apparatus, and store the periodic signal when the second data storage apparatus 242 is the target data storage apparatus.

The digital-to-analog conversion module 25 is configured to repeatedly send, according to the sending signal and within the sending time, the periodic signal stored by the target data storage apparatus to the receiving device.

Optionally, the selection signal may be specifically a first level signal (for example, a digital signal 0); and the first selector 23 is configured to: when the gating end of the first selector 23 receives the first level signal, control the input end 232 of the first selector 23 to connect to the first output end 233 of the first selector 23, select the first data storage apparatus 241 as the candidate data storage apparatus, and select the second data storage apparatus 242 as the target data storage apparatus. That is, within the sending time, the first selector 23 controls the input end 232 of the first selector 23 to connect to the first output end 233 of the first selector 23 and selects the first data storage apparatus 241 as the candidate data storage apparatus. The first selector 23 may be further configured to: when the gating end 231 of the first selector 23 receives a second level signal (for example, a digital signal 1), control the input end 232 of the first selector 23 to connect to the second output end 234 of the first selector 23, select the second data storage apparatus 242 as the candidate data storage apparatus, and select the first data storage apparatus 241 as the target data storage apparatus. The second level signal may also be controlled by the CPU 21.

Figure 3:
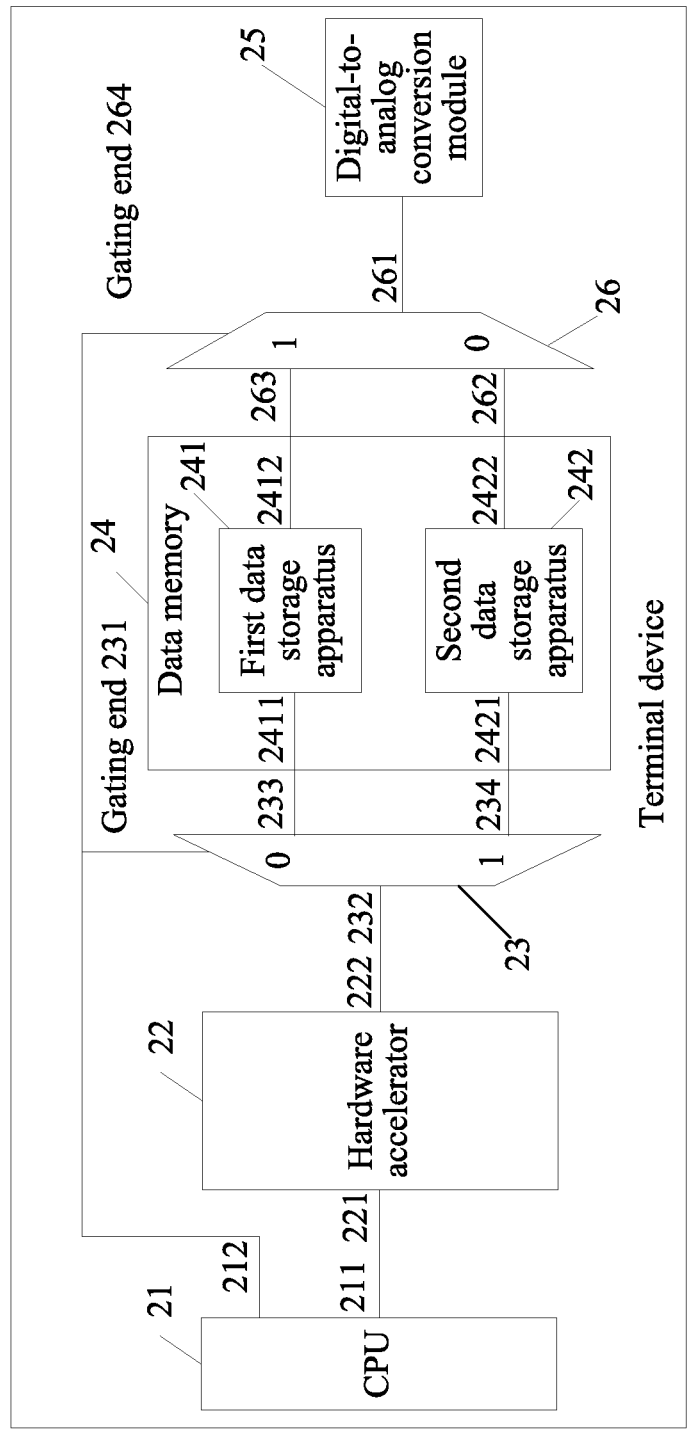
FIG. 3 is a schematic structural diagram of another terminal device according to an embodiment of the present invention.

As an optional implementation manner, the sending signal may be specifically the first level signal. As shown in FIG. 3, the terminal device may further include:

a second selector 26, where an output end 261 of the second selector 26 is connected to the input end 251 of the digital-to-analog conversion module 25; a first input end 262 of the second selector 26 is connected to the output end 2422 of the second data storage apparatus 242; a second input end 263 of the second selector 26 is connected to the output end 2412 of the first data storage apparatus 241; a gating end 264 of the second selector 26 is connected to the gating end 231 of the first selector 23; and the second selector 26 is configured to: when the gating end 264 of the second selector 26 receives the first level signal, control the output end 261 of the second selector 26 to connect to the first input end 262 of the second selector 26; and when the gating end 264 of the second selector 26 receives the second level signal, control the output end 261 of the second selector 26 to connect to the second input end 263 of the second selector 26.

Optionally, the gating end 231 of the first selector 23 and the gating end 264 of the second selector 26 may be connected together. A schematic diagram of signal transmission of the CPU 21, the hardware accelerator 22, and the digital-to-analog conversion module 25 may be shown in FIG. 4, where the first level signal is 0 and the second level signal is 1. When a signal connected to the gating end 264 of the second selector 26 is the second level signal (which is 1 in FIG. 4), the first selector 23 transmits the computation signal to the second data storage apparatus 242 (that is, the computation signal processed by the CPU 21 and the hardware accelerator 22 is stored into the second data storage apparatus 242). The second selector 26 transmits the periodic signal stored by the first data storage apparatus 241 to the digital-to-analog conversion module 25. The digital-to-analog conversion module 25 sends the periodic signal stored by the first data storage apparatus 241 to the receiving device (that is, the digital-to-analog conversion module 25 sends the periodic signal in the first data storage apparatus 241 to the receiving device). When a signal received by the gating end 264 of the second selector 26 is the first level signal (which is 0 in FIG. 4), that is, within the sending time, the first selector 23 transmits the computation signal to the first data storage apparatus 241 (that is, the computation signal processed by the CPU 21 and the hardware accelerator 22 is stored into the first data storage apparatus 241). The second selector 26 transmits the periodic signal stored by the second data storage apparatus 242 to the digital-to-analog conversion module 25. The digital-to-analog conversion module 25 sends the periodic signal stored by the second data storage apparatus 242 to the receiving device (that is, the digital-to-analog conversion module 25 sends the periodic signal in the second data storage apparatus 242 to the receiving device).

Figure 5:
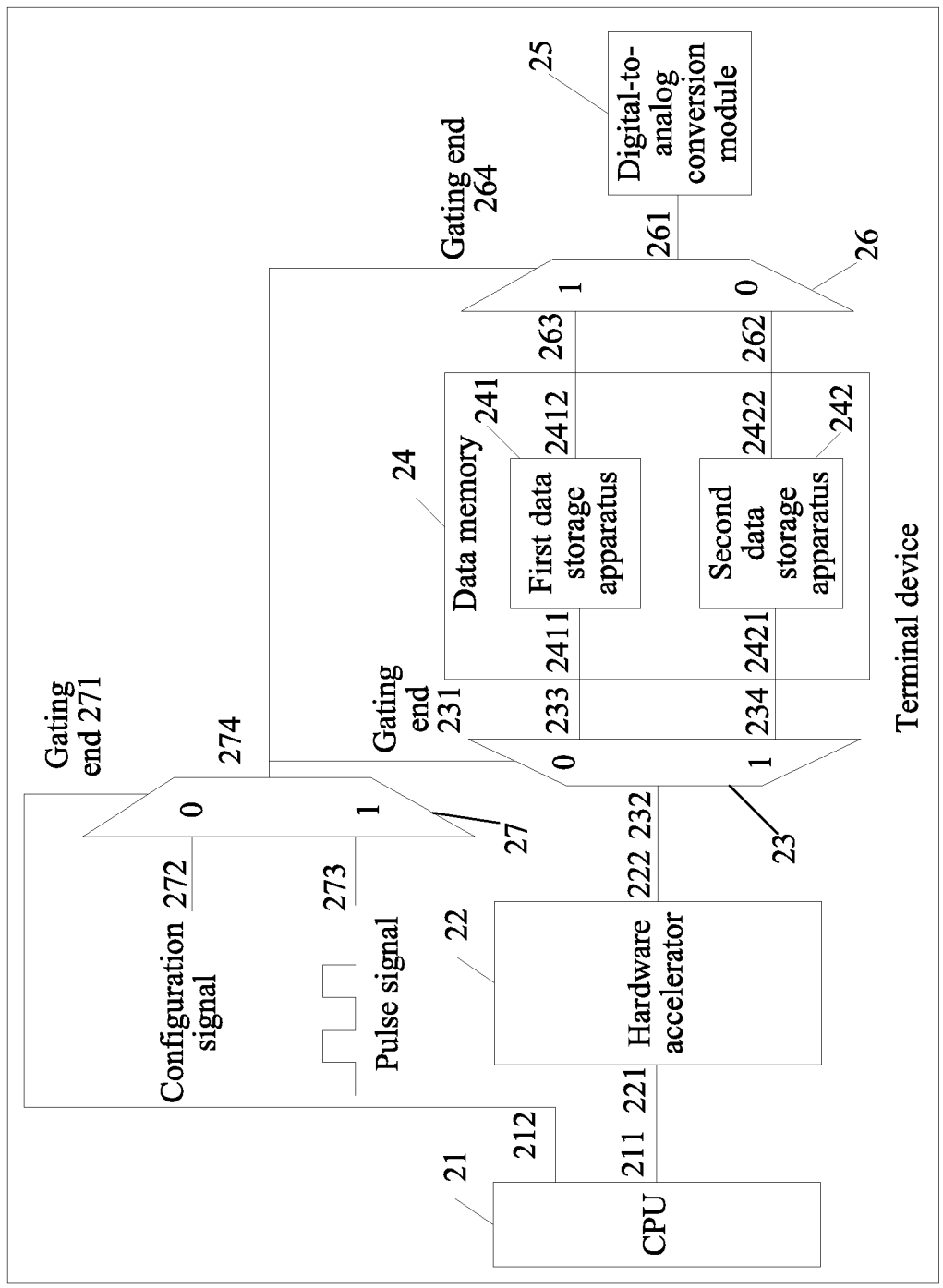
FIG. 5 is a schematic structural diagram of another terminal device according to an embodiment of the present invention.

As an optional implementation manner, as shown in FIG. 5, the terminal device may further include:

a third selector 27, where a gating end 271 of the third selector 27 is connected to the second output end 212 of the CPU 21; a first input end 272 of the third selector 27 is connected to a configuration signal; a second input end 273 of the third selector 27 is connected to a pulse signal; an output end 274 of the third selector 27 is connected to the gating end 231 of the first selector 23; and the third selector 27 is configured to: when receiving, by using the gating end 271, the first level signal sent by the CPU 21, control the output end 274 of the third selector 27 to connect to the first input end 272 of the third selector 27; and when receiving, by using the gating end, the second level signal sent by the CPU 21, control the output end 274 of the third selector 27 to connect to the second input end 273 of the third selector 27, where the configuration signal is the first level signal configured in advance or a signal configured by the CPU 21 for the third selector 27, and the pulse signal is a periodic pulse signal alternately formed by the first level signal and the second level signal.

Optionally, the signal configured by the CPU 21 for the third selector 27 may be a signal configured by the CPU 21 for the third selector 27 and a signal of a fixed value (for example, fixed as 0 or fixed as 1).

Figure 4:
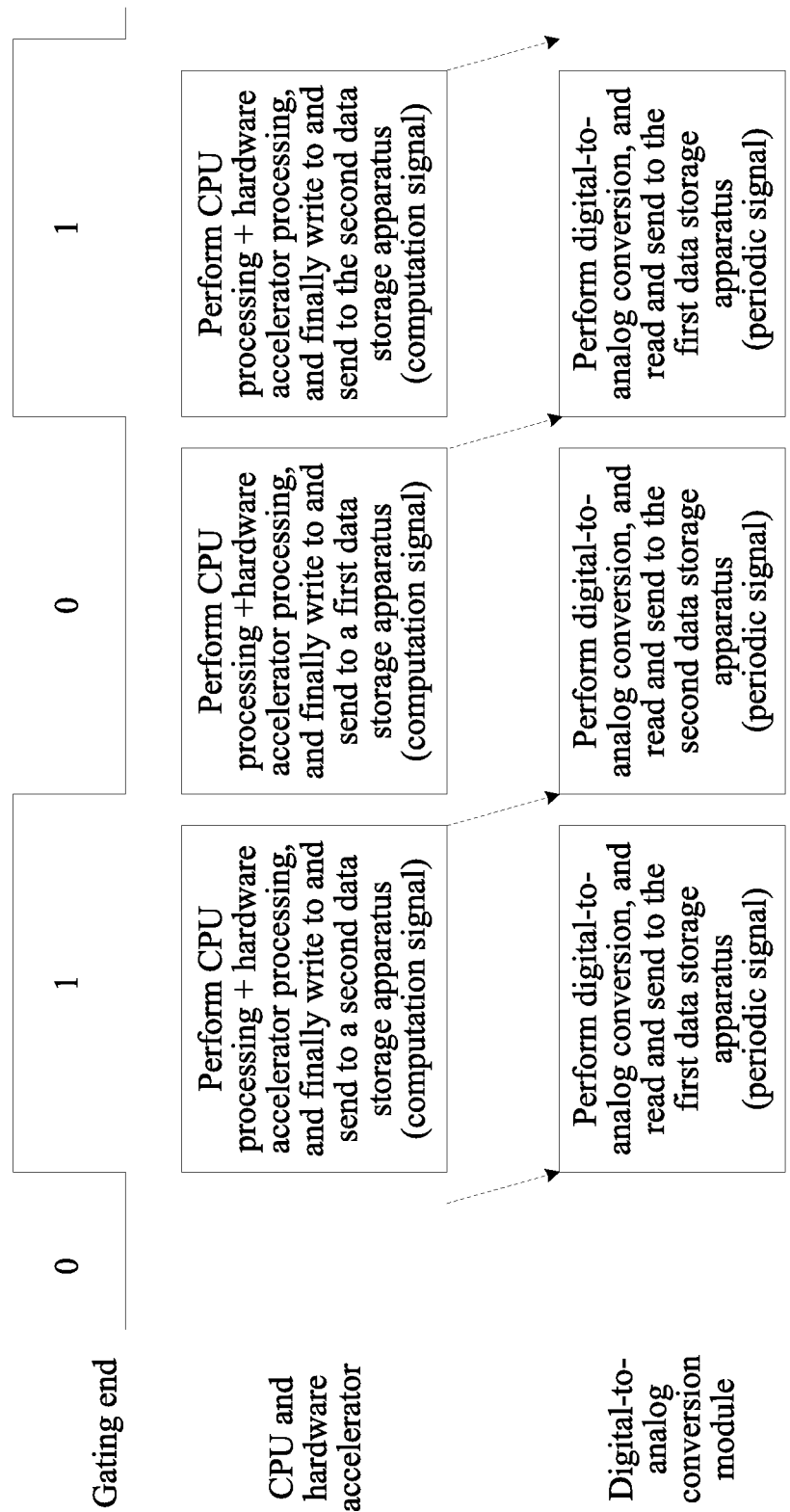
FIG. 4 is a schematic diagram of optional signal processing method according to an embodiment of the present invention.

In this implementation manner, the gating end 271 of the third selector 27 may be connected to different signals to control the digital-to-analog conversion module 25 to send different signals, or control the CPU 21 and the hardware accelerator 22 to process different signals. For example, when the gating end 271 of the third selector 27 is connected to the second level signal, the computation signal of the CPU 21 and the hardware accelerator 22 and the signal sent by the digital-to-analog conversion module 25 are the same. Definitely, when the CPU 21 and the hardware accelerator 22 compute a signal, the digital-to-analog conversion module 25 also sends a signal, that is, the first data storage apparatus 241 and the second data storage apparatus 242 read and write alternately, and a written signal and a read signal are the same. In addition, when the gating end 271 of the third selector 27 is connected to the second level signal, the second input end 273 of the third selector 27 is connected to the pulse signal. In this way, the signal processed by the CPU 21 and the hardware accelerator 22 alternates with the signal sent by the digital-to-analog conversion module 25, as shown in FIG. 4. In a first pulse (high level 1), the first selector 23 stores the computation signal into the second data storage apparatus 242, and at the same time, the second selector 26 transmits the periodic signal stored by the first data memory to the digital-to-analog conversion module 25. In a second pulse (low level 0), the first selector 23 stores the computation signal into the first data storage apparatus 241, and at the same time, the second selector 26 transmits the periodic signal (that is, the computation signal stored by the first selector 23 into the second data storage apparatus 242 in the pulse) stored by the second data memory to the digital-to-analog conversion module 25.

Figure 6:
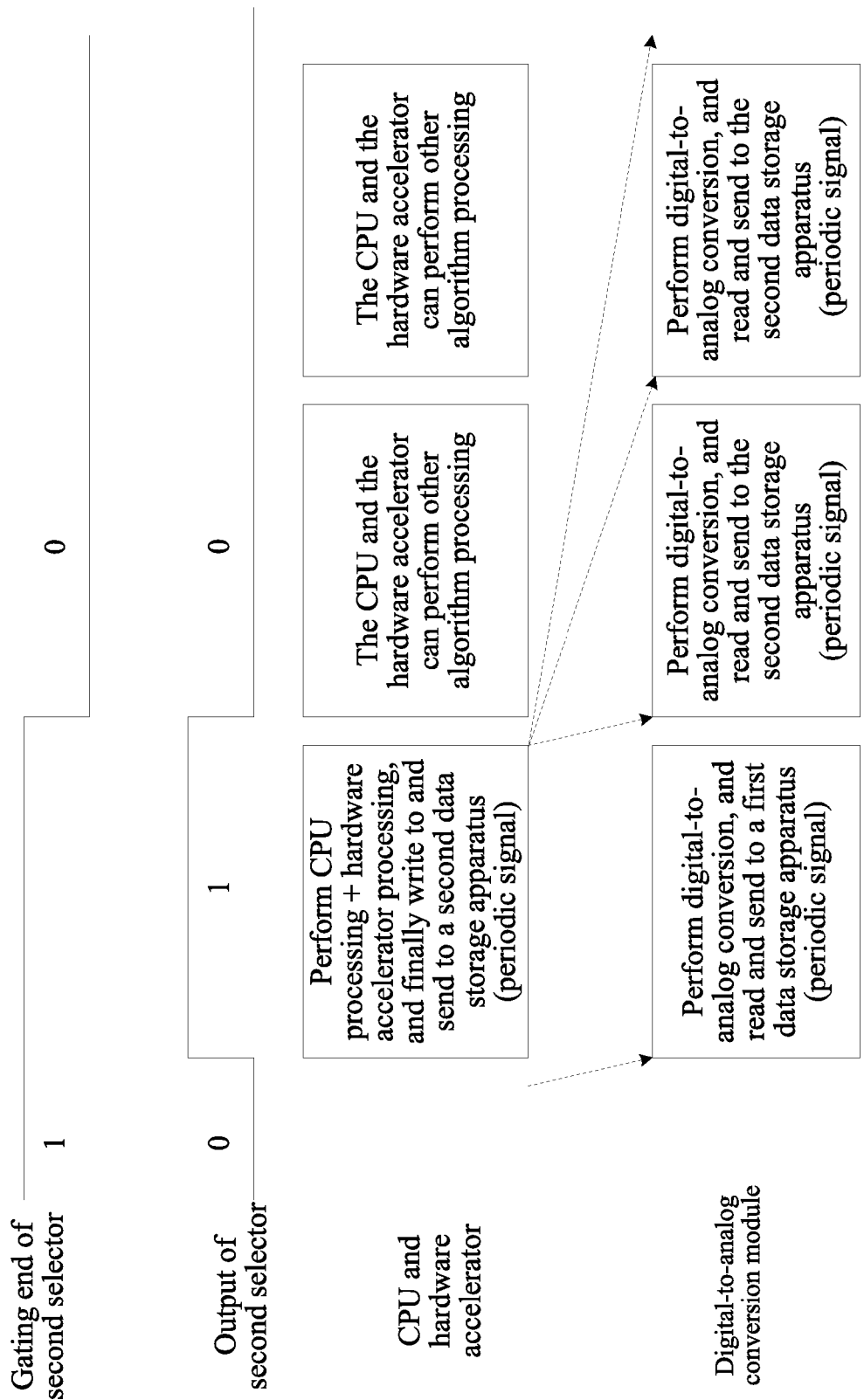
FIG. 6. is a schematic diagram of another optional signal processing method according to an embodiment of the present invention.

When the gating end 271 of the third selector 27 is connected to the first level signal, for example: within the sending time, the computation signal of the CPU 21 and the hardware accelerator 22 and the signal sent by the digital-to-analog conversion module 25 are not the same, that is, when the digital-to-analog conversion module 25 sends a signal to the receiving device, the CPU 21 and the hardware accelerator 22 can process another signal. In addition, when the gating end 271 of the third selector 27 is connected to the first level signal, the first input end 272 of the third selector 27 is connected to the configuration signal, that is, when the gating end 264 of the second selector 26 is connected to the first level signal. As shown in FIG. 6, the first level signal is an all-zero signal (that is, a section of signal at the back of a first row in FIG. 6), and the configuration signal is an all-zero signal (that is, a section of signal at the back of a second row in FIG. 6). The digital-to-analog conversion module 25 sends the periodic signal stored by the second data storage apparatus 242, so that, in order to update the periodic signal sent to the receiving device, for example: before the sending time, the CPU 21 may first configure a transient second level signal for the gating end 271 of the third selector 27, that is, the gating end 264 of the second selector 26 is connected to the second level signal (that is, a section of signal of 1 in the front of the first row in FIG. 6). In this way, the output end 274 of the third selector 27 outputs the pulse signal (that is, the section of signal of 1 in the front of the first row in FIG. 6) connected to the second input end 273 of the third selector 27. In this case, the computation signal processed by the CPU 21 and the hardware accelerator 22 is the same as the periodic signal, that is, the CPU 21 generates the periodic signal; in addition, the digital-to-analog conversion module 25 sends the periodic signal stored in advance in the first data storage apparatus 241 to the receiving device, and the periodic signal generated by the CPU 21 is transmitted to the second data storage apparatus 242. When the sending time is up, the CPU 21 can configure the configuration signal for the gating end 271 of the third selector 27, that is, the gating end 264 of the second selector 26 is connected to the first level signal. In addition, the computation signal processed by the CPU 21 and the hardware accelerator 22 is not the same as the periodic signal (that is, it can be understood that other algorithm processing is performed, as shown in FIG. 6). In addition, the first selector 23 transmits the computation signal to the first data storage apparatus 241, and the digital-to-analog conversion module 25 sends the periodic signal stored by the second data storage apparatus 242 to the receiving device. In this way, the digital-to-analog conversion module 25 can send uninterruptedly the periodic signal stored by the second data storage apparatus 242 to the receiving device, and the CPU 21 and the hardware accelerator 22 can perform other computations.

Figure 7:
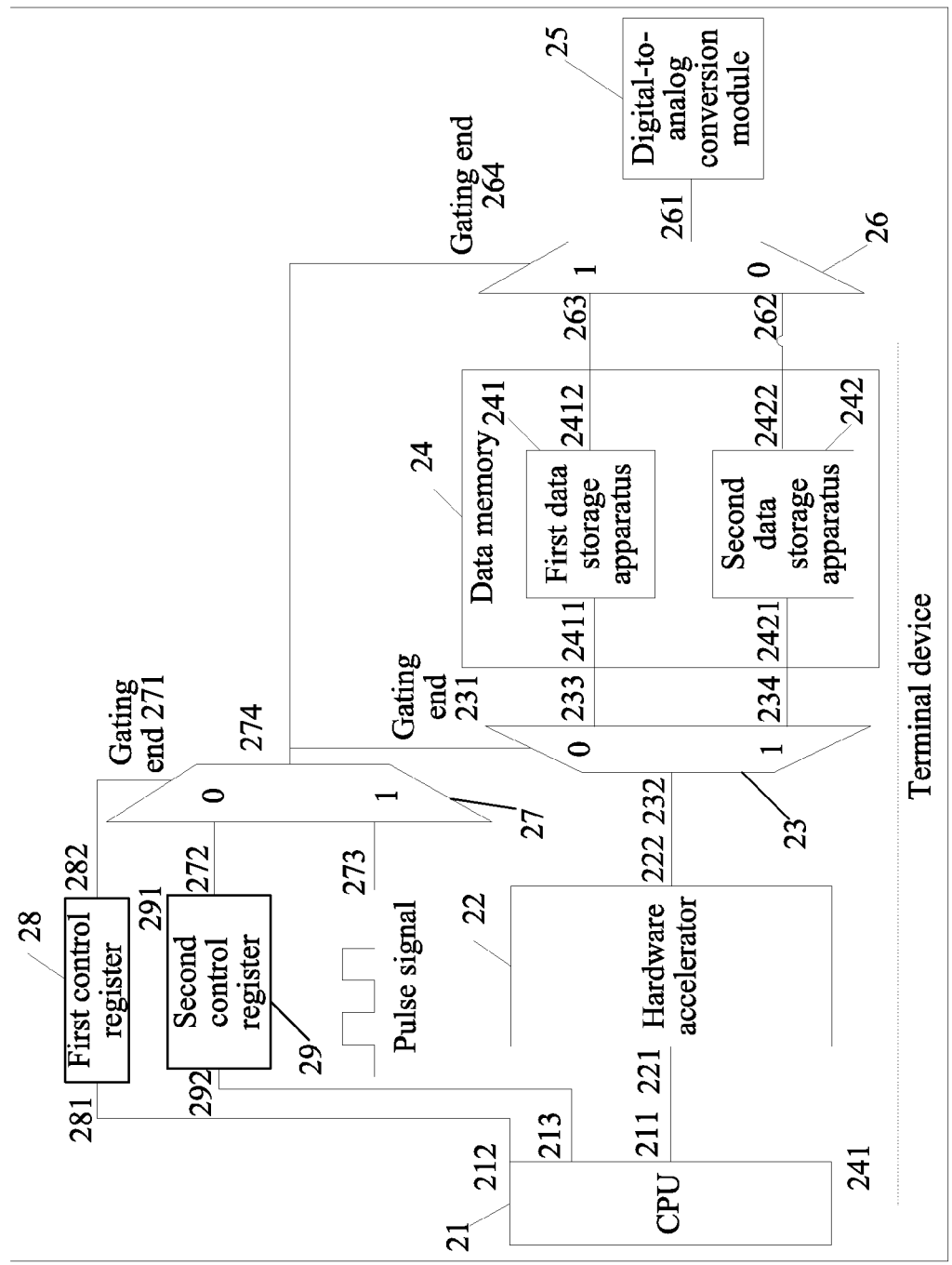
FIG. 7 is a schematic structural diagram of another terminal device according to an embodiment of the present invention.

Optionally, as shown in FIG. 7, the terminal device may further include:

a first control register 28, where an input end 281 of the first control register 28 is connected to the second output end 212 of the CPU 21; an output end 282 of the first control register 28 is connected to the gating end 271 of the third selector 27; and the first control register 28 is configured to send the first level signal to the gating end 271 of the third selector 27 within the sending time and send the second level signal to the gating end 271 of the third selector 27 beyond the sending time.

The CPU 21 is further configured to send a control signal to the first control register 28, and the control signal is used to make the first control register 28 send the first level signal to the gating end 271 of the third selector 27 within the sending time, and make the first control register 28 send the second level signal to the gating end 271 of the third selector 27 beyond the sending time.

In this implementation manner, a signal connected to the gating end 271 of the third selector 27 may be controlled by the CPU 21. When the computation signal processed by the CPU 21 is the same as the periodic signal, that is, when the CPU 21 generates the periodic signal, the CPU 21 sends the second level signal to the gating end 271 of the third selector 27.

Optionally, the terminal device may further include:

a second control register 29, where an output end 291 of the second control register 29 is connected to the first input end of the third selector 27, an input end 292 of the second control register 29 is connected to a third output end 213 of the CPU 21, and the second control register 29 is configured to receive the configuration signal sent by the CPU 21 and send the configuration signal to the first input end 272 of the third selector 27.

In this implementation manner, the configuration signal connected to the first input end 272 of the third selector 27 can be sent by the CPU 21.

Optionally, an input end 214 of the CPU 21 is connected to the output end 2412 of the first data storage apparatus 241, the input end of the CPU 21 is further connected to the output end 2422 of the second data storage apparatus 242, and the CPU 21 is further configured to read a signal stored by the first data storage apparatus 241 or the second data storage apparatus 242.

In this implementation manner, the CPU 21 sends a reading or writing control signal to the first data storage apparatus 241 or the second data storage apparatus 242.

Optionally, the hardware accelerator 22 includes: at least one hardware accelerator 22 connected in series. For example: the hardware accelerator 22 includes at least one of the following:

a hardware accelerator 221, configured to perform constellation diagram mapping processing on the computation signal;

a hardware accelerator 222, configured to perform inverse transform processing of discrete fourier transform on the computation signal; and a hardware accelerator 223, configured to perform filtering processing on the computation signal.

In the foregoing technical solutions, a plurality of optional implementation manners is added based on the foregoing embodiment. In the implementation manners, a terminal device can further use software resources and hardware resources to perform other computations while needing to process uninterruptedly an initialization signal in an initialization process.

Figure 8:
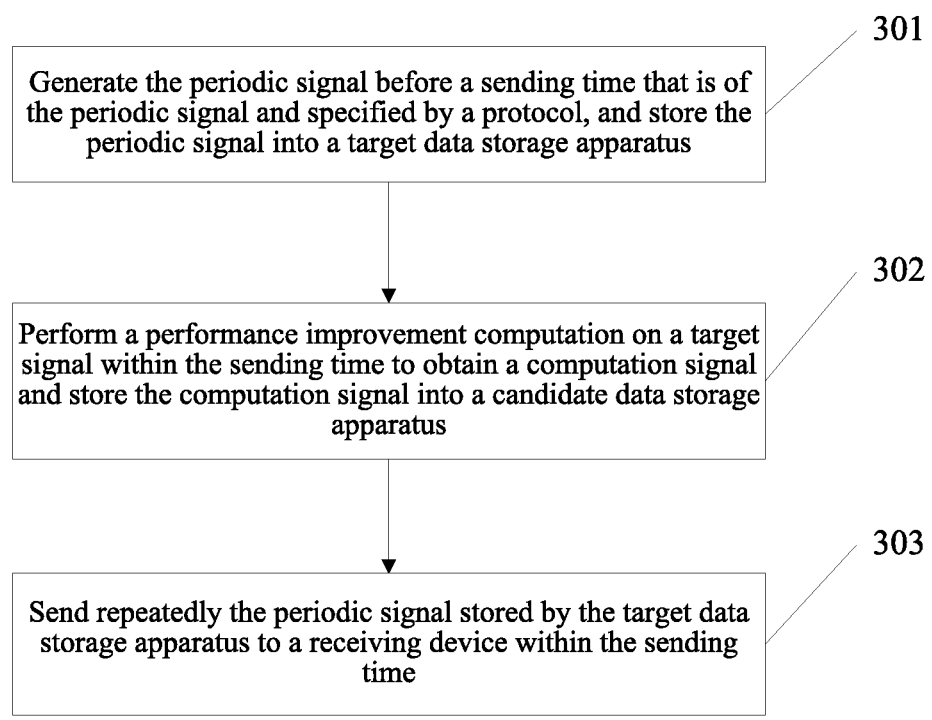
FIG. 8 is a schematic flowchart of a method for sending a periodic signal according to an embodiment of the present invention.

FIG. 8 is a schematic flowchart of a method for sending a periodic signal according to an embodiment of the present invention, and as shown in FIG. 8, the method includes:

301: Generate the periodic signal before a sending time that is of the periodic signal and specified by a protocol, and store the periodic signal into a target data storage apparatus, where the periodic signal is a periodic signal used for channel training.

302: Perform a performance improvement computation on a target signal within the sending time to obtain a computation signal and store the computation signal into a candidate data storage apparatus.

303: Send repeatedly the periodic signal stored by the target data storage apparatus to a receiving device within the sending time.

Optionally, the method may be further implemented in combination with the CPU, the hardware accelerator, the first selector, the second selector, the third selector, the data memory, the first control register, the second control register, and the digital-to-analog conversion module provided in the foregoing embodiments.

In the foregoing technical solutions, a performance improvement computation is performed on the target signal within the sending time that is of the periodic signal and specified by the protocol, so as to obtain the computation signal. In addition, the digital-to-analog conversion module sends repeatedly the periodic signal stored by the target data storage apparatus to the receiving device within the sending time, where the periodic signal is a periodic signal used for the channel training. In this way, in an initialization process, the terminal device can further use software resources and hardware resources to perform other computations while needing to process uninterruptedly an initialization signal.

A person of ordinary skill in the art may understand that all or a part of the processes of the methods in the embodiments may be implemented by a computer program instructing relevant hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

The foregoing descriptions are merely exemplary embodiments of the present invention, but not intended to limit the scope of the present invention. Any equivalent change made according to the appended claims of the present invention should fall within the scope of the present invention.

What is claimed is:

1. A terminal device, comprising:
a central processing unit;
a data memory comprising a first data storage apparatus and a second data storage apparatus;
a first selector; and
a digital-to-analog conversion module;
wherein a first output end of the central processing unit is connected to an input end of the first selector;
wherein a second output end of the central processing unit is connected to a gating end of the first selector; and
wherein the central processing unit is programmed to:
perform, according to a sending time that is of a periodic signal and specified by a protocol, a performance improvement computation on a target signal within the sending time, to obtain a computation signal;
transmit the computation signal to the input end of the first selector;
control to send a selection signal to the gating end of the first selector within the sending time, wherein the selection signal is used to cause the first selector select a data storage apparatus from the first data storage apparatus and the second data storage apparatus as a candidate data storage apparatus;
control to send a sending signal to the digital-to-analog conversion module within the sending time, wherein the sending signal is used to cause the digital-toanalog conversion module send a signal stored by a target data storage apparatus to a receiving device; generate the periodic signal before the sending time; and transmit the periodic signal to the input end of the first selector, wherein the periodic signal is a periodic signal used for channel training;

wherein a first output end of the first selector is connected to an input end of the first data storage apparatus;

wherein a second output end of the first selector is connected to an input end of the second data storage apparatus;

wherein the first selector is configured to receive the selection signal, to select a data storage apparatus from the first data storage apparatus and the second data storage apparatus as the candidate data storage apparatus according to the selection signal, to select the other data storage apparatus from the first data storage apparatus and the second data storage apparatus as the target data storage apparatus, to transmit the computation signal to the candidate data storage apparatus, and to transmit the periodic signal to the target data storage apparatus;

wherein an output end of the first data storage apparatus is connected to an input end of the digital-to-analog conversion module;

wherein the first data storage apparatus is configured to store the computation signal when the first data storage apparatus is the candidate data storage apparatus, and to store the periodic signal when the first data storage apparatus is the target data storage apparatus;

wherein an output end of the second data storage apparatus is connected to the input end of the digital-to-analog conversion module;

wherein the second data storage apparatus is configured to store the computation signal when the second data storage apparatus is the candidate data storage apparatus, and to store the periodic signal when the second data storage apparatus is the target data storage apparatus; and wherein the digital-to-analog conversion module is configured to repeatedly send, according to the sending signal and within the sending time, the periodic signal stored by the target data storage apparatus to the receiving device.

2. The terminal device according to claim 1, wherein the terminal device further comprises a hardware accelerator, wherein an input end of the hardware accelerator is connected to the first output end of the central processing unit, an output end of the hardware accelerator is connected to the input end of the first selector, and the hardware accelerator is configured to perform hardware acceleration processing on the computation signal transmitted by the central processing unit and then to transmit the computation signal obtained by acceleration processing to the first selector.

3. The terminal device according to claim 2, wherein the hardware accelerator comprises a plurality of hardware accelerators connected in series.

4. The terminal device according to claim 1, wherein the selection signal is a first level signal and the first selector is configured to:

when the gating end of the first selector receives the first level signal, control the input end of the first selector to connect to the first output end of the first selector, select the first data storage apparatus as the candidate data storage apparatus, and select the second data storage apparatus as the target data storage apparatus; and when the gating end of the first selector receives a second level signal, control the input end of the first selector to connect to the second output end of the first selector, select the second data storage apparatus as the candidate data storage apparatus, and select the first data storage apparatus as the target data storage apparatus.

5. The terminal device according to claim 4, wherein the sending signal is the first level signal, the terminal device further comprising a second selector:

wherein an output end of the second selector is connected to the input end of the digital-to-analog conversion module;

wherein a first input end of the second selector is connected to the output end of the second data storage apparatus;

wherein a second input end of the second selector is connected to the output end of the first data storage apparatus;

wherein a gating end of the second selector is connected to the gating end of the first selector; and wherein the second selector is configured to, when the gating end of the second selector receives the first level signal, control the output end of the second selector to connect to the first input end of the second selector, and when the gating end of the second selector receives the second level signal, control the output end of the second selector to connect to the second input end of the second selector.

6. The terminal device according to claim 5, wherein the terminal device further comprises a third selector;

wherein a gating end of the third selector is connected to the second output end of the central processing unit;

wherein a first input end of the third selector is connected to a configuration signal;

wherein a second input end of the third selector is connected to a pulse signal;

wherein an output end of the third selector is connected to the gating end of the first selector; and wherein the third selector is configured to, when receiving, by using the gating end, the first level signal sent by the central processing unit, control the output end of the third selector to connect to the first input end of the third selector, and when receiving, by using the gating end, the second level signal sent by the central processing unit, control the output end of the third selector to connect to the second input end of the third selector, wherein the configuration signal is the first level signal configured in advance or a signal configured by the central processing unit for the third selector, and wherein the pulse signal is a periodic pulse signal alternately formed by the first level signal and the second level signal.

7. The terminal device according to claim 6, wherein the terminal device further comprises a first control register:

wherein an input end of the first control register is connected to the second output end of the central processing unit;

wherein an output end of the first control register is connected to the gating end of the third selector;

wherein the first control register is configured to send the first level signal to the gating end of the third selector within the sending time and to send the second level signal to the gating end of the third selector beyond the sending time; and wherein the central processing unit is further configured to send a control signal to the first control register, the control signal being used to cause the first control register send the first level signal to the gating end of the third selector within the sending time, and to cause the first control register send the second level signal to the gating end of the third selector beyond the sending time.

8. The terminal device according to claim 7, wherein the terminal device further comprises a second control register;
wherein an output end of the second control register is connected to the first input end of the third selector;
wherein an input end of the second control register is connected to a third output end of the central processing unit; and
wherein the second control register is configured to receive the configuration signal sent by the central processing unit and to send the configuration signal to the first input end of the third selector.

9. The terminal device according to claim 1, wherein an input end of the central processing unit is connected to the output end of the first data storage apparatus, wherein the input end of the central processing unit is further connected to the output end of the second data storage apparatus, and wherein the central processing unit is further configured to read a signal stored by the first data storage apparatus or the second data storage apparatus.

10. A method for sending a periodic signal, the method comprising: generating the periodic signal before a sending time of the periodic signal and specified by a protocol, wherein the periodic signal is a periodic signal used for channel training, and wherein the periodic signal is generated by a processor; storing the periodic signal in a first one of a plurality of data storage apparatuses selected by a selector as a target data storage apparatus; performing, by the processor, a performance improvement computation on a target signal within the sending time to obtain a computation signal; storing the computation signal in a second one of the plurality of data storage apparatuses selected by the selector as a candidate data storage apparatus; and repeatedly sending the periodic signal, by a digital-to-analog converter, to a receiving device within the sending time.

11. A terminal device, comprising:
a processor;
a first selector connected to the processor; and
a data memory connected to the first selector and comprising a first data storage apparatus and a second data storage apparatus;
a digital-to-analog conversion module connected to the first data storage apparatus and the second data storage apparatus;
a nontransitory computer readable program media connected to the processor and having instructions stored therein for causing the processor to:
generate a computation signal by performing a performance improvement computation on a target signal within a sending time of a periodic signal;
send a selection signal to the first selector within the sending time, the selection signal causing the first selector to select a first one of the first data storage apparatus and the second data storage apparatus as a candidate data storage apparatus, the selection signal further causing the first selector to select a second one of the first data storage apparatus and the second data storage apparatus as a target data storage apparatus;
transmit the computation signal through the first selector to the candidate data storage apparatus;
generate the periodic signal before the sending time, wherein the periodic signal is a periodic signal used for channel training;
transmit the periodic signal through the first selector to the target data storage apparatus through the first selector; and
send a sending signal to the digital-to-analog conversion module within the sending time, the sending signal causing the digital-to-analog conversion module to repeatedly send the periodic signal to a receiving device.

* * * * *